(12) United States Patent
Salgado

(10) Patent No.: US 9,807,063 B2
(45) Date of Patent: Oct. 31, 2017

(54) CONTROL METHOD AND DEVICE FOR CONTROLLING AUTHENTICITY OF CODES RESULTING FROM APPLICATION OF A BIJECTIVE ALGORITHM TO MESSAGES

(71) Applicant: GEMALTO SA, Meudon (FR)

(72) Inventor: Stéphanie Salgado, Meudon (FR)

(73) Assignee: GEMALTO SA, Meudon (FR)

( * ) Notice: Subject to any disclaimer, the term of this patent is extended or adjusted under 35 U.S.C. 154(b) by 12 days.

(21) Appl. No.: 14/442,361

(22) PCT Filed: Nov. 12, 2013

(86) PCT No.: PCT/EP2013/073636
§ 371 (c)(1),
(2) Date: May 12, 2015

(87) PCT Pub. No.: WO2014/072529
PCT Pub. Date: May 15, 2014

(65) Prior Publication Data
US 2016/0277361 A1  Sep. 22, 2016

(30) Foreign Application Priority Data
Nov. 12, 2012 (EP) .................... 12306396

(51) Int. Cl.
*H04L 29/06* (2006.01)
*H04L 9/00* (2006.01)
*H04L 9/06* (2006.01)
*H04L 9/32* (2006.01)
*H04L 9/14* (2006.01)

(52) U.S. Cl.
CPC .......... *H04L 63/0428* (2013.01); *H04L 9/003* (2013.01); *H04L 9/0618* (2013.01); *H04L 9/0643* (2013.01); *H04L 9/14* (2013.01); *H04L 9/3242* (2013.01); *H04L 9/3249* (2013.01); *H04L 63/123* (2013.01)

(58) Field of Classification Search
CPC .................................................. H04L 63/0428
USPC ......................................................... 713/168
See application file for complete search history.

(56) References Cited

U.S. PATENT DOCUMENTS

| | | |
|---|---|---|
| 2005/0021990 A1 | 1/2005 | Liardet et al. |
| 2006/0245588 A1 | 11/2006 | Hatakeyama |
| 2010/0077225 A1 | 3/2010 | Salgado et al. |
| 2010/0142705 A1* | 6/2010 | Reffe .................... H04L 9/0643 380/46 |

OTHER PUBLICATIONS

International Search Report and Written Opinion, dated Dec. 5, 2013 for corresponding International Patent Application No. PCT/EP2013/073636, filed on Nov. 12, 2013, European Patent Office, P.B. 5818 Patentlaan 2 NL—2280 HV Rijswijk.

* cited by examiner

*Primary Examiner* — Jacob Lipman
(74) *Attorney, Agent, or Firm* — The Jansson Firm; Pehr B. Jansson

(57) ABSTRACT

A device (CD) is intended for controlling authenticity of a code received with a message by an electronic device (ED2) and resulting from application to this message of a bijective algorithm with at least one predetermined key. This device (CD) has i) a first computation means (CM1) arranged for applying partly this bijective algorithm with this predetermined key, from a starting step to a chosen intermediate step, to the received message, in order to get a first result, ii) a second computation means (CM2) arranged for applying partly in a reverse manner the bijective algorithm with the predetermined key, from an ending step to this chosen intermediate step, to the received code while using the received message, in order to get a second result, and iii) a comparison means (CM3) arranged for comparing these first and second results and for outputting an information representative of the authenticity of the received code when the first and second results are identical.

20 Claims, 1 Drawing Sheet

CONTROL METHOD AND DEVICE FOR CONTROLLING AUTHENTICITY OF CODES RESULTING FROM APPLICATION OF A BIJECTIVE ALGORITHM TO MESSAGES

TECHNICAL FIELD

The present invention relates to electronic devices or products using authenticated received messages, and more precisely to authentication control of codes associated to received messages.

BACKGROUND OF THE INVENTION

As it is known by the man skilled in the art, some electronic devices generate messages that are intended to be transmitted to other electronic devices, for instance for controlling functions and/or rights (such as access or credits). To avoid a non-authorized electronic device to transmit a non-authorized message, a bijective algorithm can be applied with at least one predetermined key to this message before transmission. This bijective algorithm may comprise a ciphering or cryptographic algorithm that is successively applied to N blocks of data resulting from the division of the message, for instance.

The result of this application is a code, which is generally called MAC ("Message Authentication Code"). This code and the associated message are transmitted to the concerned electronic device. To authenticate this received code, the electronic device applies the same bijective algorithm with the same predetermined key to the received message in order to get a reference code. If this reference code is identical to the received code, the latter is considered as authentic and the message can be used, otherwise the message is rejected.

Unfortunately, such a bijective algorithm may be attacked by an attacker to get each predetermined key it uses and therefore becoming capable of transmitting any authorized message. So, this attacker may transmit successively the same message with different codes to an electronic device to make it compute reference codes that it will have to compare respectively to the received codes, and then may deduce each predetermined key from these successive comparisons and from physical effect variations occurring into the attacked electronic device. It is recalled that some internal operations or processes may be recognized by characteristic physical effects, such as a specific power consumption, a specific temperature or a specific electromagnetic interaction, for instance.

Attacks based on power consumption analysis (generally called DPA ("Differential Power Analysis")) may be performed either on starting steps of the bijective algorithm or on ending steps of the bijective algorithm. The first ones (generally called "DPA by the beginning") are relatively easy to block, for instance with specific countermeasures. The second ones (generally called "DPA by the end") are much more difficult to block. They may be carried out when the attacker knows the code (or submitted MAC) that is received by the attacked electronic device, because he becomes capable of learning the result of the application of the ciphering or cryptographic algorithm that is used into the bijective algorithm. This second type of attacks is facilitated by the fact that the computed reference code is compared byte by byte to the received code (or submitted MAC).

SUMMARY OF THE INVENTION

So, an objective of the invention is to overcome the above described drawbacks at least partly by authenticating the received codes without computing reference codes.

More precisely, the invention provides a method, intended for controlling authenticity of a code received with a message by an electronic device and resulting from application to this message of a bijective algorithm with at least one predetermined key, and comprising the steps of:

(i) applying partly this bijective algorithm with this predetermined key, from a starting step to a chosen intermediate step, to the received message, in order to get a first result, (ii) applying partly in a reverse manner this bijective algorithm with this predetermined key, from an ending step to this chosen intermediate step, to the received code while using the received message, in order to get a second result, and (iii) considering that the received code is authentic if these first and second results are identical.

The control method according to the invention may include additional characteristics considered separately or combined, and notably:

the intermediate step may vary from one application to another one, possibly in a random manner;

in the case where the bijective algorithm comprises N successive parts that must be respectively applied to N blocks of data resulting from division of the received message and each combined with the result of the application of the preceding algorithm part to the preceding block, one may proceed first to the division of the received message in step (i), and one may choose the end of a n-th algorithm part as intermediate step, or in a variant one may choose an intermediate sub part of a n-th algorithm part as intermediate step;

in steps (i) and (ii) one may apply only a ciphering or cryptographic algorithm or a reverse version of this ciphering or cryptographic algorithm with a first part of the predetermined key in every algorithm part differing from the N-th one. In this case, in step (ii) one may apply first the reverse version of the ciphering or cryptographic algorithm with the first part of the predetermined key to the received code, to get a first intermediate result, then one may apply the ciphering or cryptographic algorithm with a second part of the predetermined key to the first intermediate result, to get a second intermediate result, then one may apply again the reverse version of the ciphering or cryptographic algorithm with the first part of the predetermined key to the second intermediate result, to get a third intermediate result, and finally one may dissociate the N-th block of data of the received message from the third intermediate result to get the result of the reverse version of the N-th algorithm part;

the ciphering or cryptographic algorithm may be chosen from a group comprising at least a simple Data Encryption Standard algorithm (DES), a triple Data Encryption Standard algorithm (TDES), an Advanced Encryption Standard algorithm (AES), and a RSA algorithm (Rivest Shamir Adleman).

The invention also provides a control device, intended for controlling authenticity of a code received with a message by an electronic device and resulting from application to this message of a bijective algorithm with at least one predetermined key, and comprising:

a first computation means arranged for applying partly this bijective algorithm with this predetermined key, from a starting step to a chosen intermediate step, to the received message, in order to get a first result, a second computation means arranged for applying partly in a reverse manner the bijective algorithm with the predetermined key, from an ending step to this chosen intermediate step, to the received code while using the received message, in order to get a second result, and a comparison means arranged for comparing these first and second results and for outputting an information representative of the authenticity of the received code when the first and second results are identical.

The control device according to the invention may include additional characteristics considered separately or combined, and notably:

it may comprise a control means arranged for varying the intermediate step from one application to another one, possibly in a random manner;

it may comprise a control means arranged for dividing the received message into N blocks of data in the case where the bijective algorithm comprises N successive parts that must be respectively applied to N blocks of data resulting from division of the received message and each combined with the result of the application of the preceding algorithm part to the preceding block, and for choosing the end of a n-th algorithm part as intermediate step, or in a variant for choosing an intermediate sub part of a n-th algorithm part as intermediate step;

its first and second computation means may be arranged for applying only a ciphering or cryptographic algorithm or a reverse version of the ciphering or cryptographic algorithm with a first part of the predetermined key in every algorithm part differing from the N-th one. In this case, its second computation means may be further arranged for applying the reverse version of the ciphering or cryptographic algorithm with the first part of the predetermined key to the received code, to get a first intermediate result, then for applying the ciphering or cryptographic algorithm with a second part of the predetermined key to the first intermediate result, to get a second intermediate result, then for applying again the reverse version of the ciphering or cryptographic algorithm with the first part of the predetermined key to the second intermediate result, to get a third intermediate result, and finally for dissociating the N-th block of data of the received message from the third intermediate result to get the result of the reverse version of the N-th algorithm part;

the ciphering or cryptographic algorithm may be chosen from a group comprising at least a simple Data Encryption Standard algorithm (DES), a triple Data Encryption Standard algorithm (TDES), an Advanced Encryption Standard algorithm (AES), and a RSA algorithm (Rivest Shamir Adleman).

The invention also provides an electronic device comprising a control device such as the one above introduced.

This electronic device may be chosen from a group comprising at least a smart card, a memory card reader, a telecommunication device, and a portable memory means.

BRIEF DESCRIPTION OF THE FIGURES

Other features and advantages of the invention will become apparent on examining the detailed specifications hereafter and the appended drawings, wherein.

DETAILED DESCRIPTION OF THE PREFERRED EMBODIMENT

The appended drawings may serve not only to complete the invention, but also to contribute to its definition, if need be.

The invention aims, notably, at offering a control method, and an associated control device CD, intended for controlling authenticity of codes received with associated messages by an electronic device ED2 and resulting from application to these messages of a bijective algorithm with at least one predetermined key K.

In the following description it will be considered that the electronic device ED2 is a smart card. For instance, it may be a credit card or an electronic identity card or else an electronic passport. But the invention is not limited to this type of electronic device. It concerns a lot of secured devices, and notably card readers, software protection dongles, telecommunication devices (for instance smart phones, electronic tablets, or fixed or portable computers), portable memory means (for instance USB keys), and secure modules present in a machine-to-machine communication in smart-metering devices.

Figure 1:
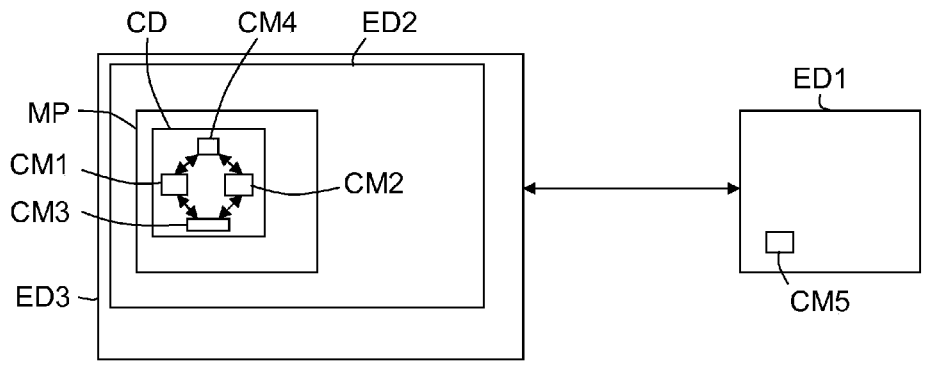
FIG. 1 schematically and functionally illustrates a first electronic device coupled to a second electronic device comprising a third electronic device having a microprocessor comprising a control device according to the invention, and FIG. 2 schematically and functionally illustrates an example of algorithm that can be used in a control method implemented by a control device according to the invention.

In the example illustrated in FIG. 1 the electronic device ED2 is located into another electronic device ED3 which is capable, at least, of receiving data transmitted by still another electronic device ED1.

For instance, the electronic device ED3 is a card reader with a telecommunication module, and the electronic device ED1 is a fixed or portable computer (or any other type of telecommunication equipment (or device)).

The electronic device ED1 generates messages to be transmitted to the electronic device ED3 and comprises a computation module CM5 arranged for applying a chosen bijective algorithm with at least one predetermined key K to each generated message to produce a code that will be transmitted with the associated message.

In the following description it will be considered that the bijective algorithm comprises a ciphering or cryptographic algorithm that is successively applied to N blocks of data Bn (n=1 to N), each resulting from the division of the message to be transmitted.

This ciphering or cryptographic algorithm may be the so called simple Data Encryption Standard algorithm (or DES). But, it could be also a triple Data Encryption Standard algorithm (or TDES), or an Advanced Encryption Standard algorithm (or AES), or else a RSA algorithm (Rivest Shamir Adleman), for instance.

For instance, the computation module CM5 is arranged for dividing each generated message into N blocks of data Bn, having the same number M of bits (for instance M=8 bytes (i.e. 64 bits) and N=16), then for executing the first part PA1 of the bijective algorithm. This first part PA1 may consist in combining (CN) the first block of data B1 (n=1) with a predetermined value PV to get a first value to which is applied a ciphering algorithm CA, for instance DES, with a first part K1 of at least one predetermined key K. The application of the DES CA provides a result RP1, which is also the result of the execution of the first part PA1. Then the computation module CM5 combines (CN) the second block of data B2 (n=2) with the result RP1 to get a value to which is applied the DES CA with the first part K1 of the predetermined key K. The application of the DES CA provides a result RP2, which is also the result of the execution of the second part PA2. The computation module CM4 proceeds in the same manner for each block of data Bn, with $2 \leq n \leq N-1$. Finally, the computation module CM5 combines (CN) the N-th block of data BN (n=N) with the result RPN-1 of the execution of the N-1-th part PAN-1 to get a value to which is applied the DES CA with the first part K1 of the predetermined key K, which gives another value to which is applied the reverse version $CA^{-1}$ of the DES CA ($DES^{-1}$) with a second part K2 of the predetermined key K (which is the complementary part of the first part K1), which gives still another value to which is applied the DES CA with the first part K1 of the predetermined key K. The last application of the DES CA provides a result RPN, which is also the result of the execution of the N-th part PAN. This last result RPN is the code (or MAC) of the generated message to which has been applied the bijective algorithm. Once the electronic device ED1 has this code and the associated message at its disposal, it may transmit them to the electronic device ED3, here for authentication control by the electronic device ED2.

In the non-limiting example illustrated in FIG. 1, the electronic device ED2 comprises a microprocessor MP which comprises a control device CD according to the invention.

It is important to note that the control device CD is not mandatorily located into the microprocessor MP (or any equivalent means, such as integrated circuits, for instance). Indeed, it may be a device that is coupled to the microprocessor MP and may access to the received messages and associated codes. Such a control device CD may be also located into another device of the electronic device ED2 or ED3.

So a control device CD can be made of software modules, at least partly, or of electronic circuit(s) or hardware modules, or else of a combination of hardware and software modules (in this last case the control device CD comprises also software interfaces allowing interworking between its hardware and software modules). In case where it is made of software modules it can be stored in a memory means or in any computer software product which can be read by an electronic device.

As illustrated in FIG. 1, a control device CD, according to the invention, comprises at least first CM1 and second CM2 computation means and a comparison means CM3.

The first computation means CM1 is arranged for applying partly the same bijective algorithm that the one executed by the computation module CM5 with the same predetermined key K, from a starting step to a chosen intermediate step, to a message received by the electronic device ED2, in order to get a first result FR.

The second computation means CM2 is arranged for applying partly in a reverse manner the same bijective algorithm with the same predetermined key K, from an ending step to the chosen intermediate step, to the code RC received with the considered message while using this considered message, in order to get a second result SR.

In other words, the first computation means CM1 executes a part of the bijective algorithm in a classical way, i.e. from its beginning (or starting step), which consists in combining the first block of data B1 of the received message with the predetermined value PV to get a first value, until it reaches a chosen intermediate step, while the second computation means CM2 executes a complementary part of the bijective algorithm in a reverse way, i.e. from its end (or ending step), which consists in applying a reverse version $CA^{-1}$ of the ciphering or cryptographic algorithm CA (here $DES^{-1}$, for instance) with the first part K1 of the predetermined key K to the received code RC (associated to the concerned message) to get a first intermediate result, until it reaches the chosen intermediate step. The executed algorithm being bijective, if the received code RC is authentic, the first result FR must be necessarily identical to the second result SR. A received code RC is considered as authentic if it is the result of the application of the bijective algorithm with the predetermined key K to the associated message by the computation module CM5.

The comparison means CM3 is arranged for comparing the first FR and second SR results (computed by the first CM1 and second CM2 computation means for a received message and the associated received code RC), and for outputting an information which is representative of the authenticity of this received code RC when these first FR and second SR results are identical.

Thus, the reference code is never computed and does not appear in the computations except when the received code RC has been considered has authentic.

Moreover an attacker can no more carried out DPA by the end as the received code RC is an entry of the bijective algorithm.

More, the final comparison, which is the sensitive operation, being performed with two computed intermediate results, the attacker cannot choose anyone of these two computed intermediate results. So, the security is notably improved.

Still more, the final comparison being not performed with a computed reference code, a byte considered as incorrect during this final comparison cannot indicate which byte of the received code RC is incorrect. So there is no need to perform the final comparison in random order.

Figure 2:
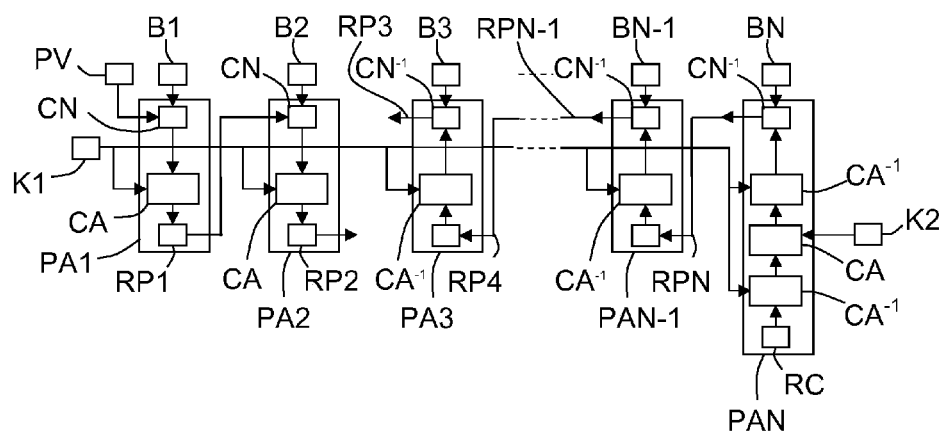

A non-limiting example of algorithm, which can be implemented by a control device CD according to the invention, is illustrated in FIG. 2. In this example one considers that the chosen intermediate step is the end of the second algorithm part PA2. So, the first result FR is the result RP2 of the execution of the second algorithm part PA2, while the second result SR is the result RP3 of the execution in a reverse manner of the third algorithm part PA3.

More precisely, in this example once a received message has been divided into N blocks of data Bn, having the same number M of bits (for instance M=8 bytes (i.e. 64 bits) and N=16), the first computation means CM1 executes the first part PA1 of the bijective algorithm.

As illustrated in FIG. 1, the control device CD may comprise a control means CM4 arranged for dividing each received message into N blocks of data Bn.

The first part PA1 may consist in combining (CN) the first block of data B1 with the predetermined value PV to get a first value to which is applied the ciphering algorithm CA (here DES, for instance), with the first part K1 of the predetermined key K. The application of the DES CA provides a result RP1, which is also the result of the execution of the first part PA1. Then the first computation means CM1 combines (CN) the second block of data B2 with the result RP1 to get a value to which is applied the DES CA with the first part K1 of the predetermined key K. The application of the DES CA provides a result RP2, which is also the result of the execution of the second part PA2 and the first result FR in this example.

In parallel (but it could be also after) the second computation means CM2 executes the N-th part PAN of the bijective algorithm in a reverse manner. So, it (CM2) applies the reverse version $CA^{-1}$ of the ciphering algorithm CA (here $DES^{-1}$) with the first part K1 of the predetermined key K to the received code RC, to get a first intermediate result, then it applies the DES CA with the second part K2 of the predetermined key K (which is the complementary part of the first part K1) to this first intermediate result, to get a second intermediate result, then it applies again the reverse version $CA^{-1}$ of the ciphering algorithm CA (here $DES^{-1}$) with the first part K1 of the predetermined key K to this second intermediate result, to get a third intermediate result, and finally for dissociating ($CN^{-1}$) the N-th block of data BN of the received message from this third intermediate result to get the result RPN of the reverse version of the N-th algorithm part PAN.

One means here by "dissociating" the reverse function $CN^{-1}$ of the combination CN (here carried out in the first PA1 and second PA2 algorithm parts).

Then the second computation means CM2 executes the N-1-th part PAN-1 of the bijective algorithm in a reverse manner. So, it (CM2) applies the reverse version $CA^{-1}$ of the ciphering algorithm CA (here $DES^{-1}$) with the first part K1 of the predetermined key K to the result RPN, to get a value from which it dissociates ($CN^{-1}$) the N-1-th block of data BN-1 of the received message to get the result RPN-1 of the reverse version of the N-1-th algorithm part PAN-1. The second computation means CM2 proceeds in the same manner for each block of data Bn, with $3 \leq n \leq N-1$, to get the second result SR at the end of the application of the reverse version of the third algorithm part PA3 (with SR=RP3).

Then this second result SR is compared with the first result FR by the comparison means CM3.

In the above described example of algorithm, the intermediate step is the end of a n-th algorithm part PAn (here n=2, for instance), with n greater than 1 and smaller than N ($2 \leq n \leq N-1$). But, this is not mandatory. Indeed, the intermediate step may be an intermediate sub part of a n-th algorithm part PAn (with $2 \leq n \leq N-1$). For instance, this intermediate sub part may be the end of a combination CN in a n-th algorithm part PAn (for the first computation means CM1) or the end of the application of a reverse version $CA^{-1}$ of the ciphering algorithm CA (here $DES^{-1}$) in this n-th algorithm part PAn (for the second computation means CM2).

The control means CM4 may be arranged for choosing the intermediate step where the first CM1 and second CM2 computation means must stop their respective computations.

It is important to note that the choice of the intermediate step, where the first CM1 and second CM2 computation means must stop their respective computations, can be predetermined. But this choice may advantageously varies, possibly in a random manner, from one application (or execution) of the bijective algorithm to another one. The control means CM4 may be in charge of this choice.

The invention can also be considered in terms of a control method for an electronic device ED2. Such a method may be implemented by means of a control device CD such as the one above described with reference to FIGS. 1 and 2. Therefore, only its main characteristics will be mentioned hereafter.

The control method according to the invention comprises the steps of:
(i) applying partly a bijective algorithm with a predetermined key K, from a starting step to a chosen intermediate step, to a received message, in order to get a first result,
(ii) applying partly in a reverse manner this bijective algorithm with this predetermined key K, from an ending step to this chosen intermediate step, to the code RC received with the message while using this received message, in order to get a second result, and
(iii) considering that this received code RC is authentic if these first and second results are identical.

These first (i), second (ii) and third (iii) steps may be respectively carried out by the first computation means CM1, the second computation means CM2 and the comparison means CM3.

The invention is not limited to the embodiments of control method, control device and electronic device described above, only as examples, but it encompasses all alternative embodiments which may be considered by one skilled in the art within the scope of the claims hereafter.

The invention claimed is:

1. A method for controlling authenticity of a code received with a message by a first electronic device (ED2) from a second electronic device, said code resulting from application of a bijective algorithm to said message using at least one predetermined key, the method comprising:
   (i) receiving, by the first electronic device, the message and the code from a second electronic device;
   (ii) applying partly said bijective algorithm to said received message, using said predetermined key, from a starting step to a chosen intermediate step, in order to determine a first result;
   (iii) applying partly in a reverse manner said bijective algorithm with said predetermined key, from an ending step to said chosen intermediate step, to said received code while using said received message, in order to determine a second result;
   (iv) comparing said first result and said second result; and
   (v) considering that said received code is authentic if said first and second results are identical.

2. The method according to claim 1, where said bijective algorithm comprises N successive parts that are respectively applied to the N blocks of data resulting from the division of said received message, wherein each algorithm part comprises a plurality of sub-parts, and wherein a first algorithm part comprises combining the first block with a predefined value and each subsequent algorithm part comprises combining a subsequent block with the result of the application of the preceding algorithm part to the preceding block, the method further comprises:
   dividing said received message in step (i) into N successive blocks, and
   defining an intermediate step by selecting an intermediate sub-part of a n-th algorithm part as said intermediate step; and
   performing said bijective algorithm from said first algorithm part to said intermediate step.

3. The method according to claim 1, wherein said intermediate step varies from one application to another one.

4. The method according to claim 3, wherein said intermediate step varies randomly from one application to another one.

5. The method according to claim 1, where said bijective algorithm comprises N successive parts that are respectively applied to the N blocks of data resulting from the division of said received message, wherein a first algorithm part comprises combining the first block with a predefined value and each subsequent algorithm part comprises combining a subsequent block with the result of the application of the preceding algorithm part to the preceding block, the method further comprises:
   dividing said received message in step (i) into N successive blocks, and defining an intermediate step by selecting the end of a n-th algorithm part as the intermediate step; and performing said bijective algorithm from said first algorithm part to said intermediate step.

6. The method according to claim 5, wherein in steps (i) and (ii) comprises application of only a ciphering or cryptographic algorithm or a reverse version of said ciphering or cryptographic algorithm with a first part of the predetermined key in every algorithm part differing from the N-th one, and in that step (ii) comprises applying first said reverse version of said ciphering or cryptographic algorithm with said first part of the predetermined key to said received code, to get a first intermediate result, then applying said ciphering or cryptographic algorithm with a second part of said predetermined key to said first intermediate result, to get a second intermediate result, then applying again said reverse version of the ciphering or cryptographic algorithm with said first part of the predetermined key to said second intermediate result, to get a third intermediate result, and finally dissociating said N-th block of data of said received message from said third intermediate result to get the result of the reverse version of the N-th algorithm part.

7. The method according to claim 6, wherein said ciphering or cryptographic algorithm is chosen from a group comprising at least a simple Data Encryption Standard algorithm, a triple Data Encryption Standard algorithm, an Advanced Encryption Standard algorithm, and a RSA algorithm.

8. A control device (CD) for controlling authenticity of a code received with a message by a first electronic device (ED2) from a second electronic device, said code resulting from application of a bijective algorithm to said message using at least one predetermined key, the control device comprising i) receiving means for receiving, by the first electronic device, the message and the code from a second electronic device; ii) a first computation means (CM1) arranged for applying partly said bijective algorithm to said received message, using said predetermined key, from a starting step to a chosen intermediate step, in order to determine a first result; iii) a second computation means (CM2) arranged for applying partly in a reverse manner said bijective algorithm with said predetermined key, from an ending step to said chosen intermediate step, to said received code while using said received message, in order to determine a second result; iv) a comparison means (CM3) arranged for comparing said first and second results; and v) an outputting means for outputting an information representative of the authenticity of said received code when said first and second results are identical.

9. The control device according to claim 8, further comprising a control means (CM4) arranged for dividing said received message into N blocks of data and where said bijective algorithm comprises N successive parts that are respectively applied to the N blocks of data resulting from the division of said received message, wherein each algorithm part comprises a plurality of sub-parts, and wherein a first algorithm part comprises—combining the first block with a predefined value and each subsequent algorithm part comprises combining a subsequent block with the result of the application of the preceding algorithm part to the preceding block, and for choosing an intermediate sub part of a n-th algorithm part as intermediate step, and performing said bijective algorithm from said first algorithm part to said intermediate step.

10. The control device according to claim 8, further comprising a control means (CM4) arranged for varying said intermediate step from one application to another one.

11. The control device according to claim 10, wherein said control means (CM4) is arranged for varying randomly said intermediate step from one application to another one.

12. The control device according to claim 8, further comprising a control means (CM4) arranged for dividing said received message into N blocks of data and where said bijective algorithm comprises N successive parts that are respectively applied to the N blocks of data resulting from the division of said received message, wherein a first algorithm part comprises—combining the first block with a predefined value and each subsequent algorithm part comprises combining a subsequent block with the result of the application of the preceding algorithm part to the preceding block, for choosing the end of a n-th algorithm part as intermediate step, and for performing said bijective algorithm from said first algorithm part to said intermediate step.

13. The control device according to claim 12, wherein said first (CM1) and second (CM2) computation means are arranged for applying only a ciphering or cryptographic algorithm or a reverse version of said ciphering or cryptographic algorithm with a first part of the predetermined key in every algorithm part differing from the N-th one, and said second computation means (CM2) is arranged for applying said reverse version of said ciphering or cryptographic algorithm with said first part of the predetermined key to said received code, to get a first intermediate result, then for applying said ciphering or cryptographic algorithm with a second part of said predetermined key to said first intermediate result, to get a second intermediate result, then for applying again said reverse version of the ciphering or cryptographic algorithm with said first part of the predetermined key to said second intermediate result, to get a third intermediate result, and finally for dissociating said N-th block of data of said received message from said third intermediate result to get the result of the reverse version of the N-th algorithm part.

14. The control device according to claim 13, wherein said ciphering or cryptographic algorithm is chosen from a group comprising at least a simple Data Encryption Standard algorithm, a triple Data Encryption Standard algorithm, an Advanced Encryption Standard algorithm, and a RSA algorithm.

15. An electronic device (ED2), comprising a control device (CD) for controlling authenticity of a code received with a message by a first electronic device (ED2) from a second electronic device, said code resulting from application of a bijective algorithm to said message using at least one predetermined key, the control device having i) receiving means for receiving, by the first electronic device, the message and the code from a second electronic device; ii) a first computation means (CM1) arranged for applying partly said bijective algorithm to said received message, using said predetermined key, from a starting step to a chosen intermediate step in order to determine a first result; iii) a second computation means (CM2) arranged for applying partly in a reverse manner said bijective algorithm with said predetermined key, from an ending step to said chosen intermediate step, to said received code while using said received message, in order to determine a second result; iv) a comparison means (CM3) arranged for comparing said first and second results; and v) an outputting means for outputting an information representative of the authenticity of said received code when said first and second results are identical.

16. The electronic device (ED2) of claim 15 wherein the control device further comprises a control means (CM4) arranged for dividing said received message into N blocks of data and where said bijective algorithm comprises N successive parts that are respectively applied to the N blocks of data resulting from the division of said received message, wherein each algorithm part comprises a plurality of sub-parts, and wherein a first algorithm part comprises—combining the first block with a predefined value and each subsequent algorithm part comprises combining a subsequent block with the result of the application of the preceding algorithm part to the preceding block, and for choosing an intermediate sub part of a n-th algorithm part as intermediate step, and performing said bijective algorithm from said first algorithm part to said intermediate step.

17. The electronic device (ED2) of claim 15 wherein the control device further comprises a control means (CM4) arranged for varying said intermediate step from one application to another one.

18. The electronic device (ED2) of claim 17 wherein said control means (CM4) is arranged for varying randomly said intermediate step from one application to another one.

19. The electronic device (ED2) of claim 15 wherein the control device further comprises a control means (CM4) arranged for dividing said received message into N blocks of data and where said bijective algorithm comprises N successive parts that are respectively applied to the N blocks of data resulting from the division of said received message, wherein a first algorithm part comprises—combining the first block with a predefined value and each subsequent algorithm part comprises combining a subsequent block with the result of the application of the preceding algorithm part to the preceding block, for choosing the end of a n-th algorithm part as intermediate step, and for performing said bijective algorithm from said first algorithm part to said intermediate step.

20. The electronic device (ED2) of claim 19 wherein said first (CM1) and second (CM2) computation means are arranged for applying only a ciphering or cryptographic algorithm or a reverse version of said ciphering or cryptographic algorithm with a first part of the predetermined key in every algorithm part differing from the N-th one, and said second computation means (CM2) is arranged for applying said reverse version of said ciphering or cryptographic algorithm with said first part of the predetermined key to said received code, to get a first intermediate result, then for applying said ciphering or cryptographic algorithm with a second part of said predetermined key to said first intermediate result, to get a second intermediate result, then for applying again said reverse version of the ciphering or cryptographic algorithm with said first part of the predetermined key to said second intermediate result, to get a third intermediate result, and finally for dissociating said N-th block of data of said received message from said third intermediate result to get the result of the reverse version of the N-th algorithm part.

* * * * *